July 18, 1939.  J. H. GRAYSON  2,166,683

TIME CLOCK CONTROLLED AUTOMATIC MECHANISM

Filed June 7, 1937  8 Sheets-Sheet 1

INVENTOR.
JOHN H. GRAYSON
BY *Wm Edward Hann*
ATTORNEY.

July 18, 1939.　　　　J. H. GRAYSON　　　　2,166,683
TIME CLOCK CONTROLLED AUTOMATIC MECHANISM
Filed June 7, 1937　　　　8 Sheets-Sheet 3

INVENTOR.
JOHN H. GRAYSON
BY
ATTORNEY.

July 18, 1939. J. H. GRAYSON 2,166,683
TIME CLOCK CONTROLLED AUTOMATIC MECHANISM
Filed June 7, 1937 8 Sheets-Sheet 4

INVENTOR.
JOHN H. GRAYSON
BY Wm. Edward Hann
ATTORNEY.

INVENTOR.
JOHN H. GRAYSON
BY Wm. Edward Hann
ATTORNEY.

July 18, 1939.  J. H. GRAYSON  2,166,683

TIME CLOCK CONTROLLED AUTOMATIC MECHANISM

Filed June 7, 1937  8 Sheets-Sheet 6

INVENTOR.
JOHN H. GRAYSON
BY Wm Edward Hann
ATTORNEY.

July 18, 1939.  J. H. GRAYSON  2,166,683

TIME CLOCK CONTROLLED AUTOMATIC MECHANISM

Filed June 7, 1937  8 Sheets-Sheet 7

INVENTOR.
JOHN H. GRAYSON
BY Wm. Edward Hann
ATTORNEY.

July 18, 1939.  J. H. GRAYSON  2,166,683
TIME CLOCK CONTROLLED AUTOMATIC MECHANISM
Filed June 7, 1937  8 Sheets-Sheet 8
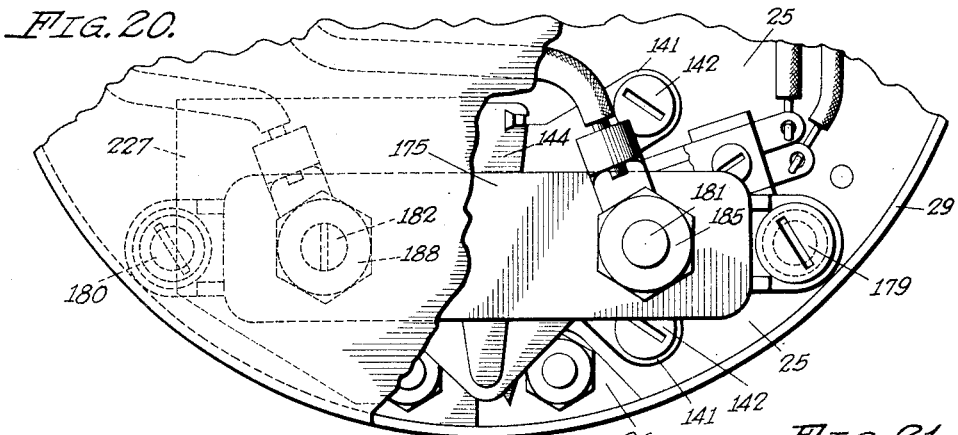
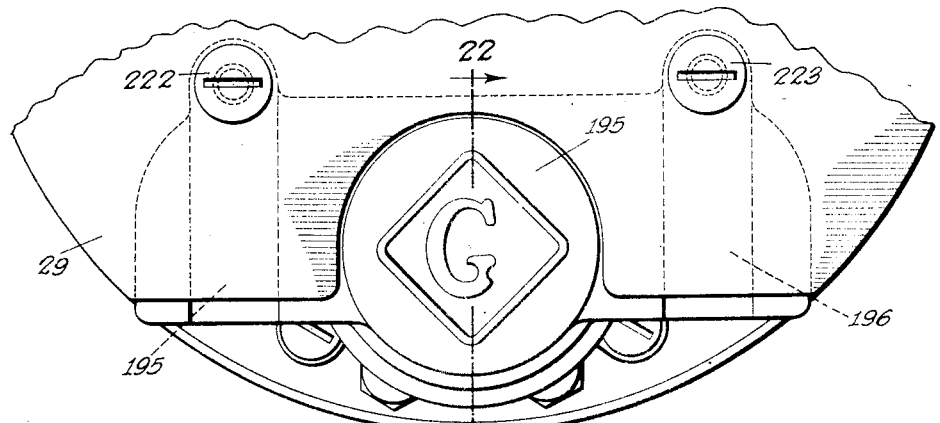
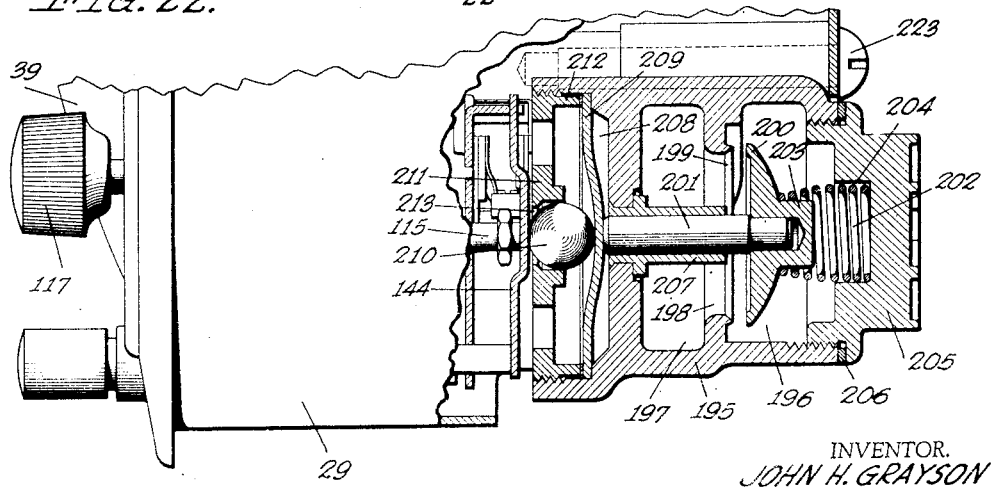
INVENTOR.
JOHN H. GRAYSON
BY  Wm Edward Hann
ATTORNEY.

Patented July 18, 1939

2,166,683

UNITED STATES PATENT OFFICE 2,166,683

TIME CLOCK CONTROLLED AUTOMATIC MECHANISM

John H. Grayson, Lynwood, Calif.

Application June 7, 1937, Serial No. 146,705

4 Claims. (Cl. 161—1)

This invention relates to mechanisms for automatically performing desired functions for a wide variety of purposes at predetermined times and is particularly useful for turning on and off the fuel or power supply of domestic electric or gas ranges or the like.

The main objects of this invention are to provide a time clock controlled automatic mechanism adapted to perform a certain function immediately or at a predetermined time in the future and to perform a second function in predetermined time-spaced relationship to the first performed function; to provide a mechanism of this character which is adapted to control either the flow of a fluid such as gas or the flow of electric current with equal facility; to provide a mechanism of this character in which the function controlling elements are standardized and in which either an electric switch or a gas valve may be installed with a minimum amount of change for the accommodation of either; to provide a time-clock mechanism which can be manually set by the operator to perform future operations automatically without mathematical calculations, thereby eliminating errors of calculation; to provide a fuel or power controlling time-clock mechanism which at all times visually indicates, directly the time at which fuel or power will begin to be supplied, the length of time for which it will be supplied, and the time at which its supply will be discontinued; to provide a device of this character which is dependable and of sturdy construction, simple as to its mechanical parts, some of which are duplicates, and well adapted for mass production whereby the cost will be exceptionally low; to provide a device of this character which may be readily assembled in quantity production and to provide a mechanism of this character which is extremely compact in design.

An illustrative embodiment of this invention is shown in the accompanying drawings, in which Fig. 1 is a face view of the improved time-clock in full size.

Fig. 20 is an enlarged fragmentary view of the improved clock with portions of the casing broken away to show the switch illustrated in Fig. 19 in mounted position within the clock case.

Fig. 21 is an enlarged fragmentary view in elevation of a fluid control valve mounted in the improved clock and adapted to be operated by the clock mechanism.

Fig. 22 is a view, partly in section and partly in elevation, taken on the line 22—22 of Fig. 21 showing the general construction of a substantially frictionless, sealed control valve for a fluid such as gas.

Figure 1:
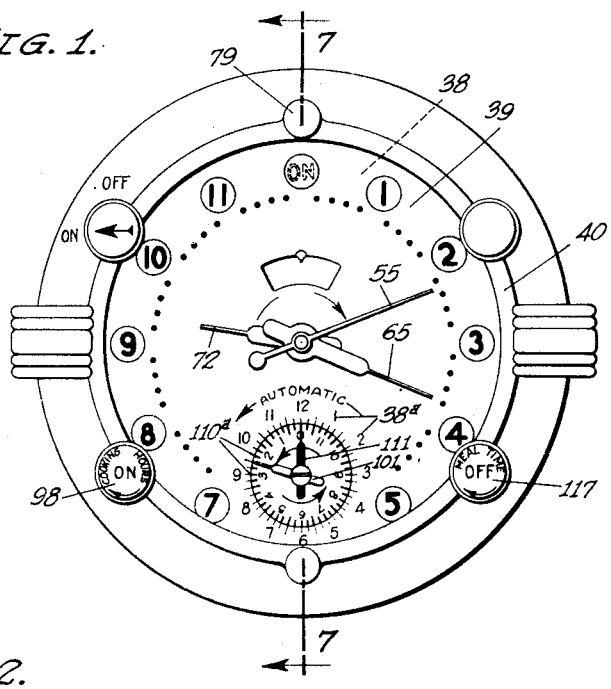
Figure 2:
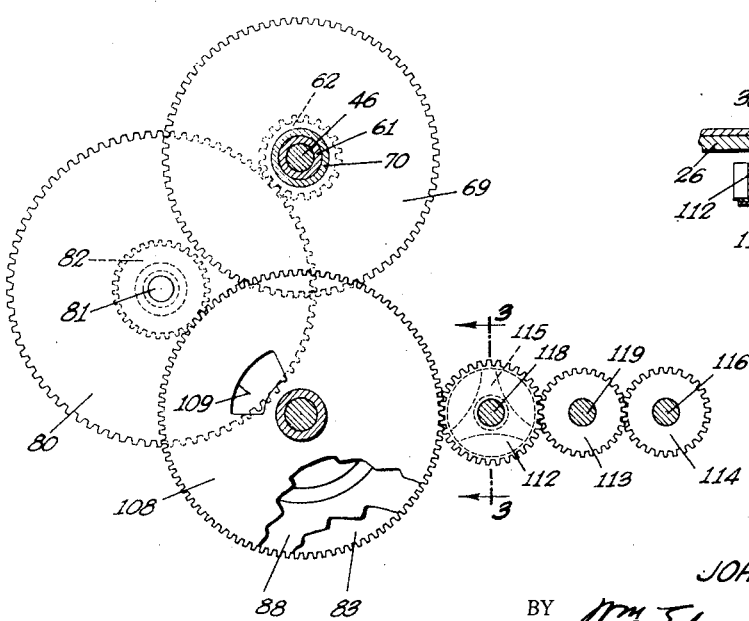
Fig. 2 is an enlarged view of some of the trains of clock gears and particularly the manual setting train for determining the "off" time.

Heretofore in the operation of timing mechanisms for turning electric and gas ranges on and off, it has been necessary for the person operating the stove to do some mental calculation in order to determine the time for setting the "on" control. For instance, if it is desired to have the meal cooked and finished at 6 o'clock and it is desired to have the cooking extended for a period of 2 hours then the person operating the stove would mentally calculate that two hours from six would leave four hours and set the stove to turn on at four o'clock. In the event, however, it is desired to have the meal finished cooking at 6:15 and it is desired to cook the meal for a period of 2¾ hours, then the calculation is not so easily made and oftentimes the housewife would make mistakes in computing the time at which the oven should turn on.

In the present invention it is unnecessary for the person operating the stove to do any of the foregoing calculation. In this improved clock, the time at which the meal is to be finished is set-off directly by one manual control knob operating a rotatable disk which carries an indicator finger or pointer and which is rotated in the direction indicated by an arrow to the desired predetermined time. The number of hours which it is desired to cook the meal is then set-off directly by another control knob and that setting will automatically position the mechanism to turn the fuel on at the correct time. The arrangement is such that the "On" control knob will rotate an indicator or pointer to not only directly show the number of cooking hours but also, by continuing the line of sight along the pointer will indicate at what hour the cooking will be started. In other words this improved timing mechanism is designed and arranged to be also an automatic time calculator.

In the construction shown in the drawings, the improved time-clock comprises a pair of substantially circular frame plates 25 and 26 held in spaced, parallel relationship by a plurality of posts or studs 27 which are spaced about the peripheral edges of the plates. One end of each post or stud 27 is riveted to the plate 26 and the other end thereof is reduced in diameter to pass through apertures in plate 25 and protrude therebeyond. Such protruding ends are threaded to receive nuts 28 which clamp the plate 25 against the shoulders formed by such reduction in diameter.

The various gear trains and reduction gears comprising the clock and time mechanism are housed between the frame plates 25 and 26 and the remainder of the operating mechanism, except the clock hands and the visual indicators, is mounted on the outer side of the plate 25, all of which is surrounded and enclosed by a cup-shaped jacket or casing 29.

The inner side of the shell or casing 29 at diametrically opposite points thereof is provided with relatively heavy straps 29ª and 29ᵇ rigidly secured thereto and which are drilled and tapped to receive screws by which the unit is mounted for service.

Figure 7:
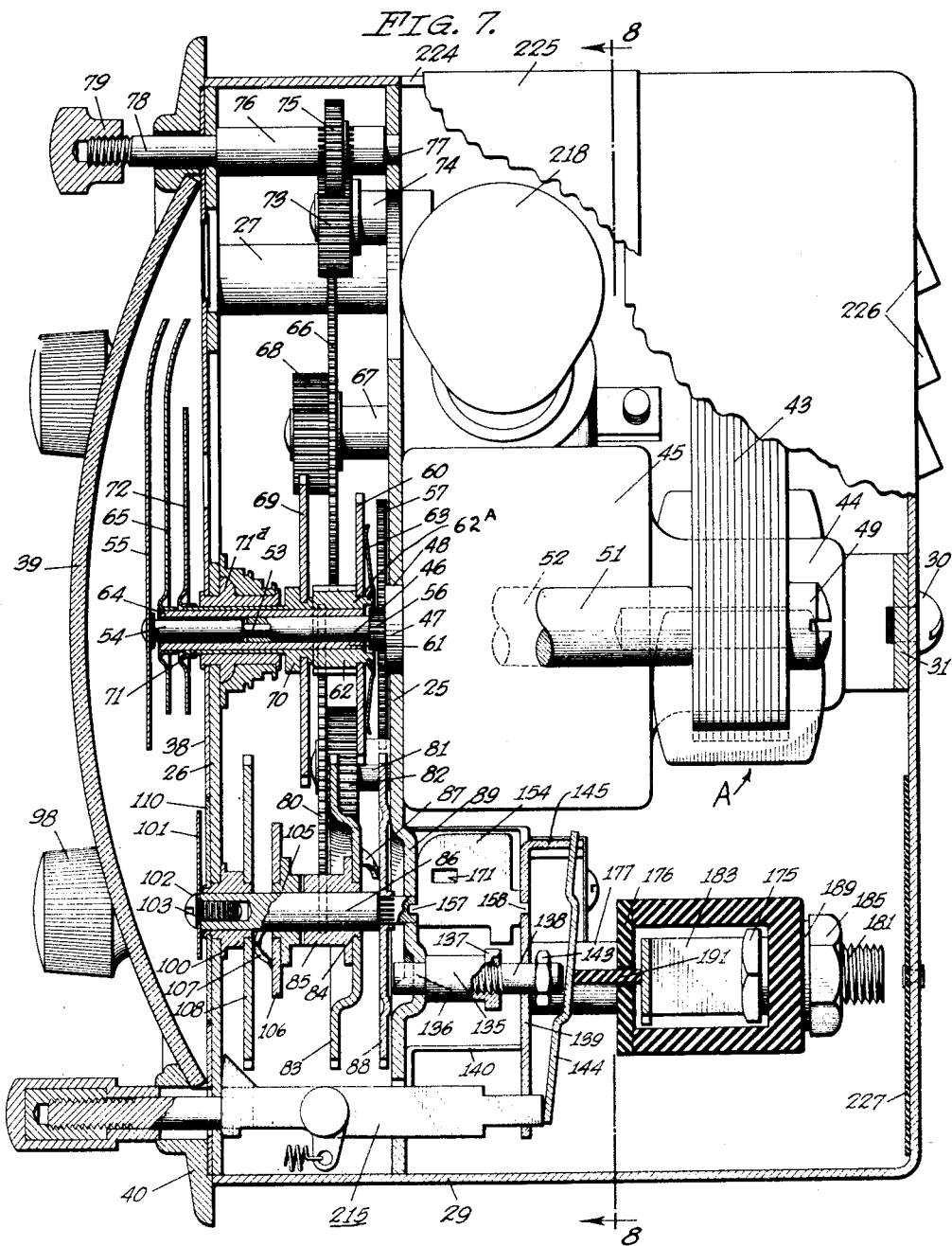
Fig. 7 is an enlarged transverse, vertical, sectional view taken on the line 7—7 on Fig. 1, looking in the direction indicated by the arrows.
Figure 8:
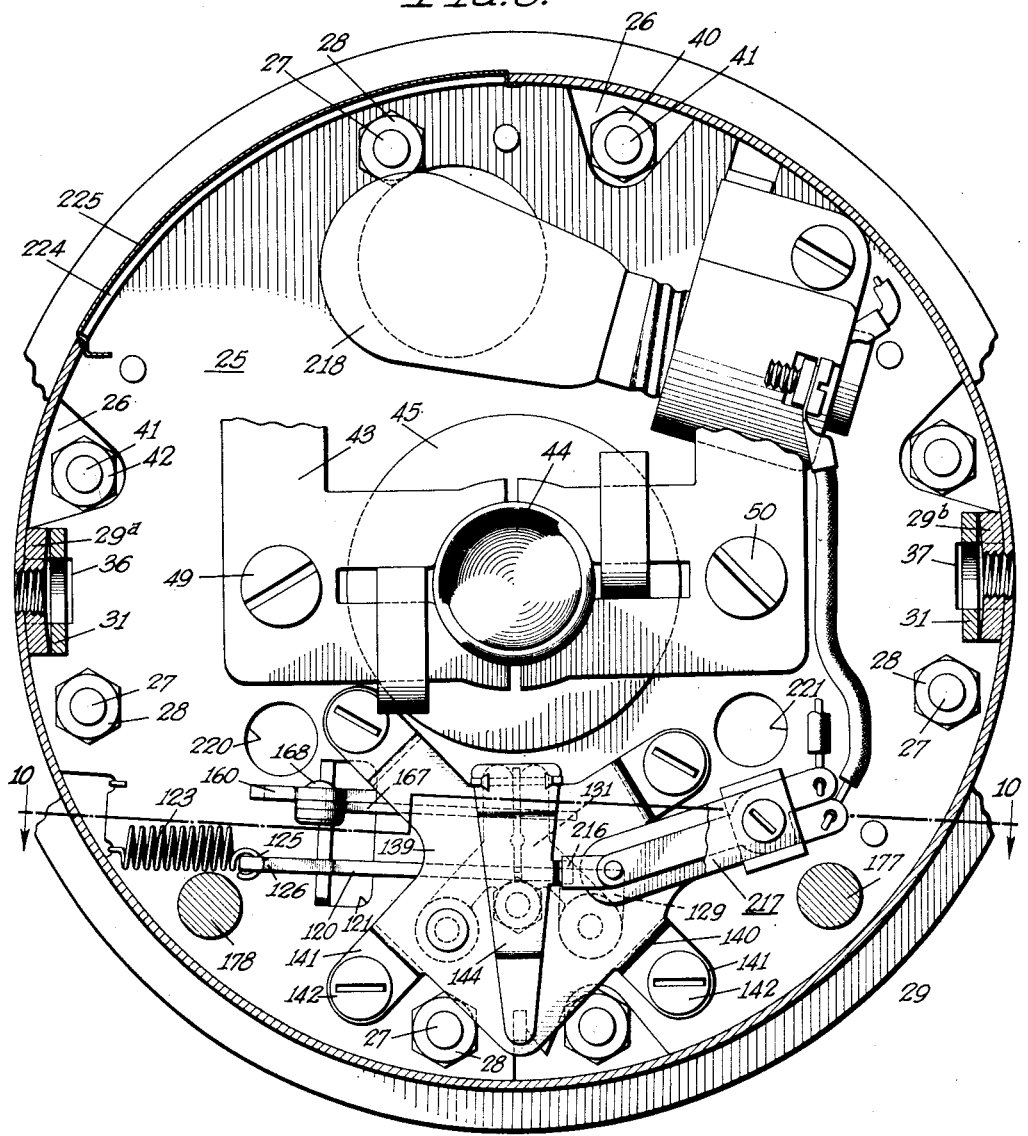
Fig. 8 is a sectional view taken on the line 8—8 of Fig. 7, looking in the direction indicated by the arrows and showing part of the operating mechanism in elevation but with the electric switch removed for purposes of clarity.
Figure 9:
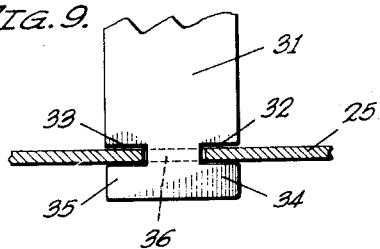
Fig. 9 is a fragmentary view in elevation of one end of the U-shaped strap to which the outer casing is attached, engaged under the frame plate.

The cup-shaped casing 29 is secured to the plate 25 so as to cover and surround the mechanism hereafter described by a pair of screws 30 one of which is shown in Fig. 7, which pass through the back of the casing and thread into the base of a U-shaped bracket 31. The ends of the legs of the bracket 31 are of like construction and are provided with aligned oppositely extending notches 32 and 33, as shown in Fig. 9, formed in opposite side edges to provide shoulders 34 and 35 respectively. The shoulders 34 and 35 form a head which is adapted to engage underneath the plate 25, when the legs of the bracket are sprung apart so that the necks formed by the notches 32 and 33 pass into notches 36 and 37 formed at diametrically opposite places in the frame plate 25 as shown most clearly in Figs. 8 and 9.

The frame plate 26, at the front of the clock, is provided with a relatively thin sheet 38 forming a clock face upon which is carried the appropriate indicia for designating twelve hours with appropriate subdivisions thereof and over which travel the hands of the time clock in the usual and customary manner. The clock face is covered by a convex glass 39 held in place by a substantially annular ring or bezel 40 which overlaps and embraces the peripheral marginal edge of the glass 39. The ring 40 is provided with a series of threaded studs 41 which pass through registering apertures in the frame plate 26, the protruding ends of which are provided with nuts 42 which bear against the inner-side of the frame plate 26 and thereby hold the ring 40 and glass 39 snugly in position.

In the embodiment of the invention illustrated, the time-clock mechanism is shown as being actuated by a synchronous electric motor generally designated A which has recently come into popular and general use, but it is to be understood that such form of actuating mechanism is not at all necessary to the invention disclosed herein, inasmuch as any means of actuating mechanism may be used to drive the time-clock.

In the construction illustrated, the electric motor A which drives the time mechanism comprises a rectangular C-shaped laminated field 43, the opposed ends of which embrace the reduced end 44 of a sealed cylindrical casing 45, such reduced end containing therein an armature. The casing 45 contains the usual set of reduction gears for securing the desired speed of rotation, i. e., one R. P. M. of a shaft 46 which protrudes from the casing 45. The casing 45, at the end thereof opposite to the reduced end 44, is provided with a concentrically positioned annular boss 47 which surrounds the motor shaft 46 and which fits snugly in an aperture 48, formed in the frame plate 25. The boss 47 holds the synchronous motor actuating mechanism securely in centered position with respect to the frame plate 25 and the motor unit is held in assembled relation thereon by screws 49 and 50, the shanks of which pass through the field 43 and thread into the outer ends of posts 51 and 52 respectively. The base ends of the posts 51 and 52 are rigidly secured by riveting to the frame plate 25 at diametrically opposite points with respect to the center of the frame plate 25, casing 45, and boss 47.

The shaft 46 of the synchronous motor unit extends a substantial distance beyond the annular boss 47 and the terminating end is provided with an axial bore or socket to receive and frictionally engage the reduced end 53 of a shaft 54, to the other end of which is secured a second hand 55 which is thus driven directly by the synchronous motor shaft 46 at a speed of one revolution per minute to rotate in a plane parallel to the clock face.

Closely adjacent to the boss 47, the shaft 46 is provided with a pinion gear 56 rigidly secured thereto and which meshes with and drives a gear 57. The gear 57 is journaled on a stub shaft 58, the base end of which is riveted to the frame plate 25. The gear 57 has a pinion 59 rigidly secured concentric therewith, which meshes with and drives a gear 60, journaled concentrically with respect to the shaft 46, on an annular hub 62A of a relatively wide faced pinion gear 62, which is rigidly secured on one end of a sleeve 61 that is journaled on the shaft 46. The gear 60 frictionally drives the pinion gear 62 through a series of spring fingers 63 which are rigidly mounted at their base ends to an extended portion of the hub 62A. The outer ends of the fingers 63 press against the face of the gear 60 to give a friction drive such as is common in time-clock mechanisms. The number of teeth of the gears and pinions comprising the gear train 56, 57, 59, and 60 are such that a 60 to 1 reduction is effected between the pinion 56 and the gear 60.

The pinion gear 62, for convenience of manufacture, is made separately and pressed on to the sleeve 61, so as to be non-rotatably supported thereon. The other end, 64 of the sleeve 61 rotatably receives the shaft 54 of the second hand 55, and terminates in spaced relation with respect to the outer end thereof. Upon the extreme end of the sleeve 64 is frictionally pressed a minute hand 65, which rotates in a plane in spaced parallel relation to the plane of rotation of the second hand 55.

The pinion gear 62 meshes with and drives a gear 66 which is journaled on the outer end of a stub shaft 67, the base of which is rigidly secured to the frame plate 25 by riveting. The gear 66 is provided with a concentrically positioned, rigidly attached pinion 68 which meshes with and drives a gear 69, the reduction being such that the gear 69 is rotated at $\frac{1}{12}$ of the speed of the pinion gear 62. The gear 69 is rigidly mounted on a hub 70 which is journaled to rotate on and concentrically with sleeve 64 and is provided with an extended tubular shank or sleeve 71 to the outer end of which is frictionally pressed an hour hand 72 which rotates in a plane in spaced parallel relation to the plane of rotation of the second and minute hands 55 and 65 respectively.

The concentrically journaled shaft 54, sleeve 64 and sleeve 71 are supported by and journaled in a bushing 71A which is secured through an opening in the center of the frame plate 26. The outer end of the bushing is flanged over for holding the face plate 38 in position on the frame plate 26.

The gear 66 also meshes with a pinion gear 73 journaled on the outer end of a stub shaft 74 which is rigidly secured by riveting to frame plate 25. The gear 73 in turn meshes with a pinion gear 75 which is rigidly secured to a shaft 76, one end of which is reduced to form a shoulder and such reduced end 77 is journaled in an opening formed in the frame plate 25. The opposite end of the shaft 76 is also reduced as shown at 78 and passes through and is journaled in an opening formed in the frame plate 26. The reduced end 78 also passes through an opening in the glass retaining ring 40 and protrudes therebeyond, such protruding end being provided with left hand threads to receive a knurled knob 79.

The knob 79 may be used to set the time-clock mechanism for positioning the hands of the clock to indicate a desired time, the left hand thread insuring that the timing mechanism can only be set by rotating the hands of the clock in a forward or right hand direction, such rotation being effected through slippage of the friction drive between the spring fingers 63 and the gear 60 without rotation of the gear 60, pinion 59, gear 57 and motor driving pinion 56.

Means are provided for causing the time mechanism to drive the necessary mechanism for causing the desired function to be initiated and terminated at pre-determined times and comprises a gear 80 journaled on a stub shaft 81 riveted to the frame plate 25 and which meshes with and is driven by the pinion gear 62. The gear 80 has a wide faced pinion gear 82 concentrically mounted rigidly therewith which meshes with and drives a cam gear 83 which has the same number of teeth as the hour hand gear 69. The gear 80 and pinion 82 are duplicates of the gear 66 and pinion 68, but mounted in reverse position.

The cam gear 83 is rigidly attached to the hub 84 of a split sleeve 85 which is rotatable and axially slidable on a shaft 86. The gear 83 has a cam finger 87 struck out from the stock thereof at one side, which is adapted to ride around on the adjacent face of a concentrically mounted manual set gear 88. The gear 88 is rigidly mounted against an annular shoulder formed by reducing the end of the shaft 86, such reduced end extending beyond the opposite side of the gear 88 and being journaled in the frame plate 25. The frame plate 25 is off-set at 89 to provide a space between the gear 88 and the frame plate for receiving the cam finger 87 when it comes in registry with and drops through a segmental aperture 90 cut out of the gear 88.

Figure 4:
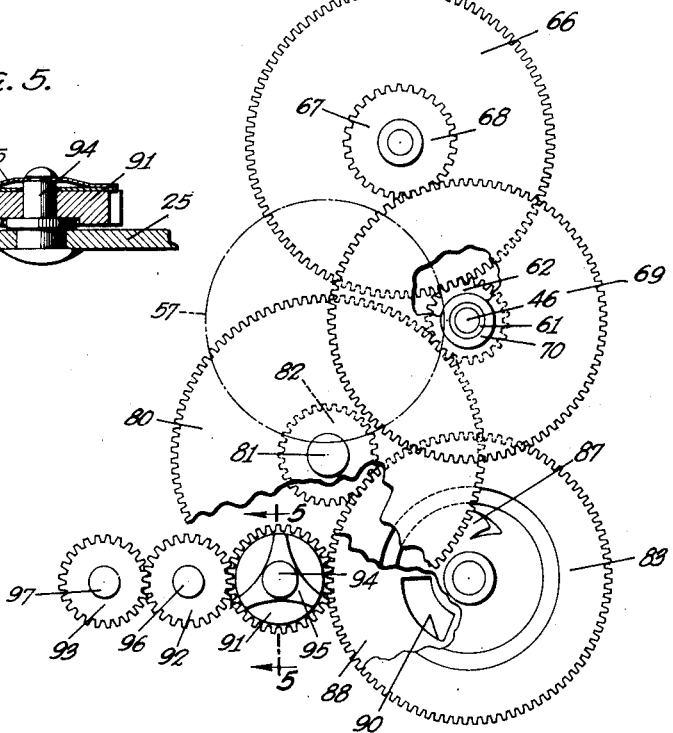
Fig. 4 is an enlarged view of the train of gears by which the "on" position of the mechanism is manually set; the gear reduction of the time-clock and the train of gears for hand-setting the time-clock.
Figure 5:
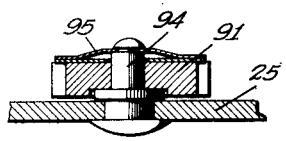
Fig. 5 is an enlarged sectional view taken on the line 5—5 of Fig. 4, showing the friction drag or brake which holds the "on" gears in the desired "set" position.
Figure 6:
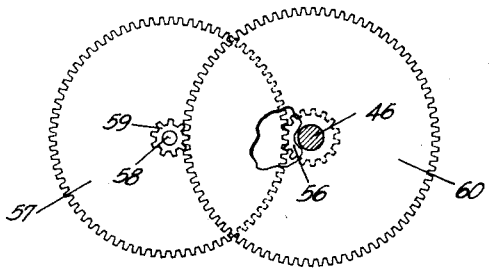
Fig. 6 is an enlarged plan view of the 60 to 1 reduction gears between the second-hand and the minute-hand drive.
Figure 10:
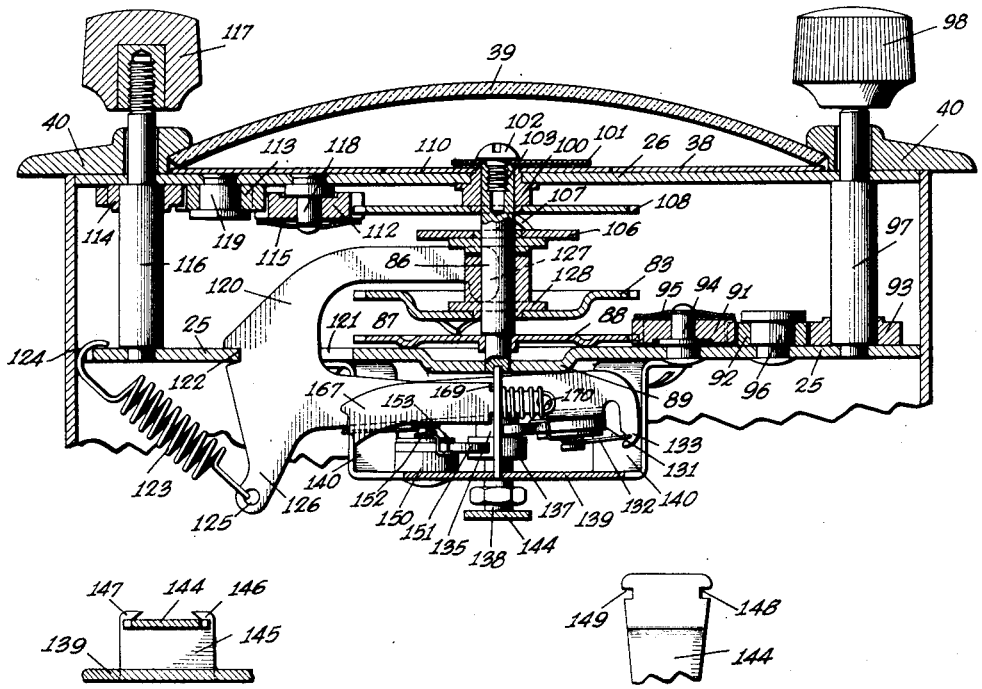
Fig. 10 is a view partly in section and partly in elevation taken generally along the line 10—10 of Fig. 8, with the operating mechanism set in position to turn "on" the fuel or power.

Means are provided for manually setting the gear 88 by rotating it relative to the time driven cam gear 83 and comprise a train of pinions 91, 92, and 93 shown most clearly in Fig. 4. The pinion 91, as shown most clearly in Figs. 5 and 10, is journaled on a stub shaft 94 riveted to the frame plate 25 and is provided with a friction drag or brake in the form of a three-fingered spring 95 which bears against the face of the gear 91 and frictionally holds the set gear 88 in adjusted position. The gear 92 is journaled on a stub shaft 96 which is riveted to the frame plate 25 and the gear 93 is rigidly mounted on a shaft 97, the reduced ends of which are journaled in the frame plates 25 and 26. The reduced end of the shaft 97 which passes through the frame plate 26, extends through an opening in the ring 40 and the terminating end thereof is threaded to receive a knurled knob 98 which is the "On" set control and which bears the indicia "Cooking hours", "On" and an arrow to indicate the direction the knob should be rotated.

Axial thrust on the shaft 86 toward the end thereof which is journaled in the frame plate 25, is taken through the gear 88 and said gear has an annular rib pressed out on the side adjacent to the plate 25 for providing a line contact therewith and thereby reducing friction, while at the same time holding the teeth of the gear 88 in spaced relation from the frame plate 25 so as to make good meshing engagement with the pinion gear 91 and preclude the possibility of becoming wedged between the gear 91 and the frame plate 25 upon which it is secured.

The end of the shaft 86 opposite to that upon which is mounted the set gear 88, is journaled in a bushing 100, which in turn is journaled in the frame plate 26 with the end of the shaft 86 protruding slightly therebeyond to receive a pointer hand or finger 101 which is secured thereto by a screw 102, threaded into an axially extending interiorly threaded socket 103 provided in the end of the shaft.

The split sleeve 85 to which is rigidly secured the time driven cam gear 83, is in the form of a constantly engaged dental clutch as shown in Figs. 10, 14, 16, and 17, and inter-engages with a complementary split sleeve or dental clutch member 104 which is an integral portion of a hub 105. The hub 105 is axially slidable on the shaft 86 but is driven through the constantly engaged clutch at the same rate of speed as its companion inter-engaging clutch member 85 and time driven gear 83. The hub 105 carries rigidly attached thereto a cam plate 106 from which is struck out a cam finger 107. The cam 107 is adapted to ride around on the adjacent face of a set gear 108 and enter into and pass through a segmental aperture 109 which is cut therethrough. The set gear 108 is rigidly mounted on one end of the hub 100 and the opposite end thereof extends beyond the frame plate 26 and has rigidly secured thereto a disk or dial 110 on the face of which is appropriate numerical indicia 110A representing equally spaced time increment units and fractions thereof.

The dial 110 is divided into 12 main divisions or time increment units and numbered 0 to 11 in left hand consecutive order with the representation of a pointer 111 placed thereon, in registry with the 0 of the indicia. The pointer 111 is preferably in a distinctive contrasting color to the background color of the dial 110 and preferably the same color as the clock face 38. The face plate 38 of the time clock is also provided with indicia 38A representing an equal number of time increment units but numbered consecutively in a right hand direction with the indicia, including the fractions of the units, arranged around the dial 110, so that the pointer 111 may be moved by rotation of the dial 110 to any desired position with respect to the twelve main time increments represented by the indicia or any fraction thereof.

Figure 3:
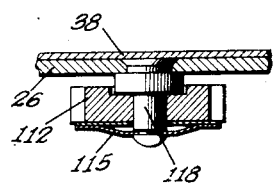
Fig. 3 is an enlarged sectional view taken on the line 3—3 of Fig. 2, showing the friction drag or brake which holds the gears in the desired "set" position.

Means are provided for setting the gear 108 at any desired position and thereby rotating the dial 110 to the pre-determined location and comprise a train of set gears 112, 113, and 114 which intermesh with each other and with the gear 108. The pinion gear 112 is provided with a friction drag or brake spring 115 which frictionally retains the set gear 108 in an adjusted position and which is shown most clearly in Figs. 3 and 10. The pinion gear 114 is rigidly secured to a shaft 116, the reduced ends of which are journaled in the frame plates 25 and 26. The reduced end of the shaft 116 which is journaled in the frame plate 26, protrudes therebeyond, passes through an opening in the ring 40 and the terminating end thereof is threaded in a right hand direction to receive a knurled knob 117, the face of which is provided with the indicia "Meal time", "Off" and an arrow which indicates the direction the knob should be rotated.

The pinion gears 112 and 113 are journaled on stub shafts 118 and 119 respectively which are rigidly riveted to the frame plate 26 as shown most clearly in Fig. 10.

Axial movement of the cam gear 83 and the hub 84 to which it is rigidly attached, control a mechanism which automatically causes the desired function to be performed, at a predetermined time. Such mechanism comprises a substantially U-shaped cam lever 120, shown most clearly in Fig. 10, which is mounted through a slot 121 formed in the frame plate 25. The lever 120 is provided with a notch 122 which embraces opposite sides of the frame plate 25 at one end of the slot 121 and is yieldingly held in such engaging position by a helical tension spring 123. One end of the spring 123 is hooked in a notch 124 formed in the marginal edge of the frame plate 25 and the other end thereof is hooked through an opening 125 formed in the extremity of a lever arm 126 formed integrally with the cam lever 120.

One leg of the cam lever 120 extends into the space between the cam gear 83 and cam plate 106 and is provided with an inwardly extending toe 127 which normally rides upon and is held yieldingly against a radially extending flange 128 integrally formed on the hub 84.

Figures 11, 12, 13:
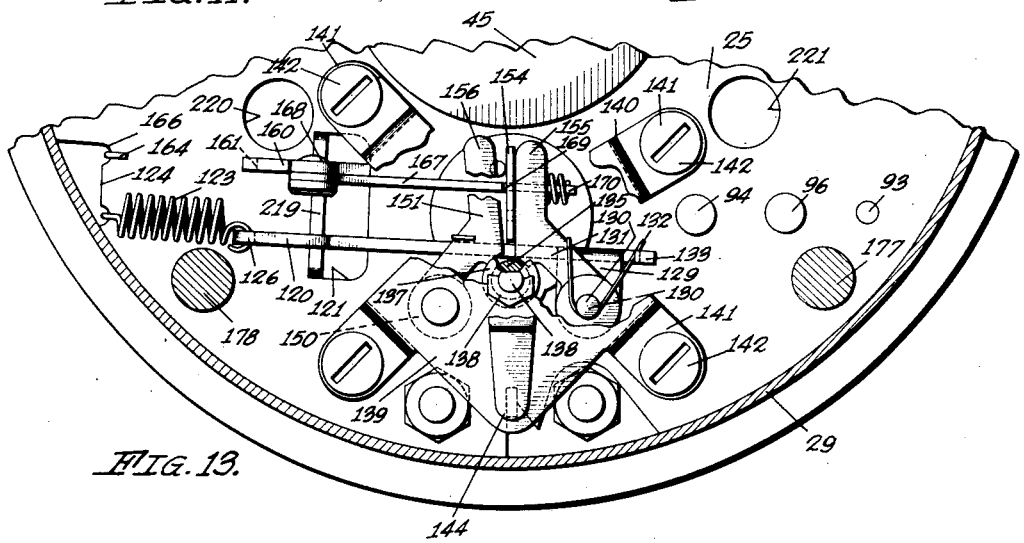
Fig. 11 is a fragmentary view, partly in section and partly in elevation, illustrating the hinged mounting of the function performing lever arm.
Fig. 12 is a fragmentary plan view of the base or hinged end of the lever arm shown in section in Fig. 11.
Fig. 13 is a fragmentary view in elevation with portions broken away and with the mechanical elements in substantially the same positions as shown in Fig. 10.

The other arm of the U-shaped cam lever 120 is provided adjacent its end with a transversely extending lug 129 which is formed by bending over, at right angles, a portion of the stock from which the arm is made. The lug 129 is provided with a pin 130 upon which a pawl 131 is pivotally mounted. The pawl 131 is normally urged to rotate to the left as viewed in Fig. 13 by a spring 132 which has one or two turns around a reduced neck of the pin 130 underneath the head thereof. One arm of the spring 132 bears against the pawl 131 and the other arm is engaged in a notch formed near the end of a finger 133 which is integrally formed on the end of the cam lever arm and in continuation thereof.

The pawl 131 has an arcuate shoulder 134 formed thereon which is normally yieldingly urged by the spring 132 to bear against a function controller or actuator (Figs. 7 and 10). The actuator comprises a body member 135 having a reduced end 136 which is axially slidable and rotatable in an opening formed in the frame plate 25 and a radially extending annular shoulder 137 integrally formed at the other end thereof. The end of the body 135 having the shoulder 137 is provided with an axially extending opening interiorly threaded to receive the threaded end of a shaft 138 which is axially slidable and rotatable in an opening formed in a bridge member 139. The bridge 139 is rigidly secured in spaced parallel relation to the frame plate 25 by four legs 140, which legs terminate in apertured toes 141 through which are secured screws 142 and which thread into the frame plate 25. The shaft 138 extends beyond the bridge 139 and such extended end is provided with an integrally formed hexagonal nut 143 for receiving a wrench, whereby the shaft 138 may be readily threaded into the body member 135.

The shaft 138 also extends slightly beyond the hexagonal nut 143 in position to contact with and swing a lever arm 144 which is mounted to permit limited oscillation, on the outwardly extending end of an arm 145 which is bent out from the stock of and transversely to the bridge member 139. The end of the arm 145 is notched in its end face to receive the base end of the lever 144 and form upstanding lugs or fingers 146 and 147 which are swadged over inwardly toward each other to loosely retain the lever arm 144. The arm 144 is also notched at opposite sides as shown at 148 and 149 to receive the fingers 146 and 147 and is thus restrained from longitudinal movement.

The under side of the bridge member 139 has riveted thereto a post or stub shaft 150 upon which is pivoted a pawl 151 which is a duplicate of the pawl 131, but mounted in reverse relation thereto. The pawl 151 is normally urged toward the function controller so as to bear against the body portion 135 or the annular shoulder 137 by a spring 152 which is wrapped around the reduced end of the post 150 underneath the head thereon. One end of the spring bears against an adjacent leg 140 which supports the bridge member and the other end bears against the pawl 151. The pawl 151 is retained upon the post 150 by a washer 153 which is interposed between the coils of the spring 152 and the pawl and which is pressed on, so as to frictionally retain the pawl 151 on its mounting.

Means are provided for spreading the pawls 131 and 151 sufficiently to permit the annular shoulder 137 to pass freely therebetween and thus permit axial movement of the function controller comprising the body member 135 and threaded shank 138. This means comprises a pawl spreader 154 in the form of a plate interposed between arms 155 and 156 of the pawls 131 and 151 respectively. The pawl spreader 154 is provided with oppositely extending integrally formed trunnions 157 and 158 which are journaled in an axially extending socket formed in the shaft 86 and an aperture provided in the bridge 139 respectively.

Means are provided for swinging the pawl spreader on its trunnions and thus spread the pawls apart and comprise a substantially L-shaped cam lever 159 mounted in a slot 121 formed in the frame plate 25. The outer edge of one leg of the cam lever 159, substantially midway therealong, is provided with a notch 161 which embraces opposite sides of the frame plate 25 at one end of the slot 121 and serves as a fulcrum for the cam lever 159.

One leg of the cam lever 159 extends into the space between the cam gear 83 and cam plate 106, at the side thereof opposite to that occupied by the cam lever arm 120 and is provided with an outwardly extending toe 162 which normally rides upon and is yieldingly urged against a radially extending flange 163 integrally formed on the hub 105 by a helical tension spring 164. One end of the spring 164 is hooked through the apertured end of a short arm 165, integrally formed on the cam lever 159 and the other end is hooked in a notch 166 formed in the frame plate 25.

The other leg of the cam lever 159 has one end of a curved link 167 pivotally secured thereto by a rivet 168. The other end of the link is reduced in size to form shoulders 169 and the reduced end 170 passes loosely through a rectangular aperture 171 formed in the pawl spreader 154.

Means are provided for yieldingly holding the pawl spreader 154 against the shoulders 169 and comprise a helical compression spring 172 which loosely surrounds the reduced end 170 of the link 167. The last or outermost coil of the spring 172 extends through an aperture 173 formed in the reduced portion 170, closely adjacent the tip end thereof.

Means are provided for giving sidewise support or bearing to the cam lever arms 120 and 159 and comprise a flange 219 struck out from the material of the frame plate 25 in a plane substantially normal to the plane of said plate and which carries a continuation of the respective slots in which the cam arms are mounted.

The improved function control mechanism may be used for a variety of purposes but the specific application disclosed herein is adapted to be used in connection with means for controlling the fuel or power of domestic gas or electric ranges.

Figure 19:
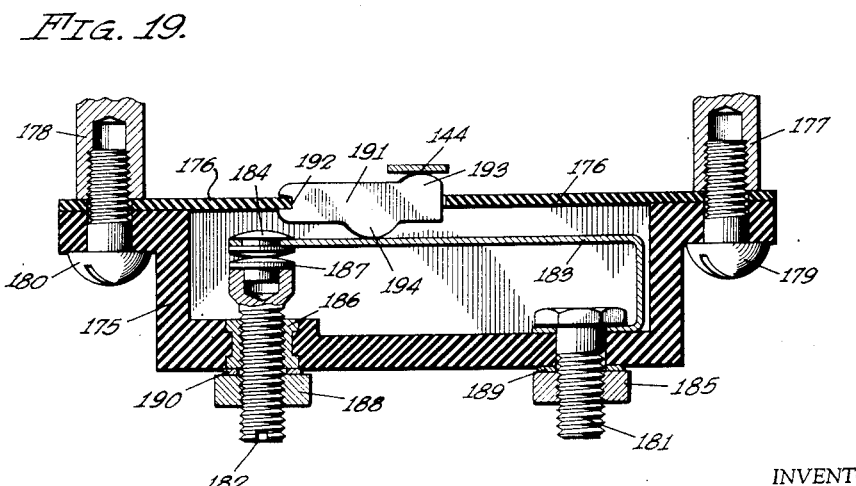
Fig. 19 is an enlarged longitudinal, medial, sectional view of an electric switch which is operated by the improved time-clock mechanism.

As illustrated in Figs. 7, 19, and 20, the lever arm 144, when swung outwardly, functions to close the contacts of an electric switch. The electric switch comprises a body member 175 preferably of moulded dielectric material having a base plate 176 also of insulating material which is secured to the outer ends of a pair of supporting posts 177 and 178 by screws 179 and 180. The base ends of the supporting posts 177 and 178 are rigidly secured to the frame plate 25 by riveting. The body member 175 is provided with a pair of threaded electric terminals 181 and 182. The terminal 181 is in the form of a headed bolt with the head inside the body and underneath which is clamped the base end of a spring conductor arm 183, the free end of which extends lengthwise of and within the body and terminates in a contact head 184. A nut 185 is threaded on the bolt 181 on the outside of the body for securely clamping the base end of the switch arm 183.

The terminal 182 is threaded through a bushing 186 which is moulded into the body 175 and the inner end of the terminal is also provided with a contact cap 187. A nut 188 is threaded on the outer extending end of the terminal 182 for locking the terminal in adjusted position relative to the contact head 184. Washers 189 and 190 are interposed between the nuts 185 and 188 respectively.

The base 176 of the electric switch is slotted to receive a relatively thin bladelike lever 191 which is provided at one end with a notch 192 for embracing opposite sides of the base plate 176 at one end of the slot in which it is mounted, thus providing a fulcrum for pivoting movement of the lever. As shown most clearly in Fig. 19, the lever 191 is provided with an outwardly extending curved portion 193 in position to be contacted by the actuating lever 144. The opposite edge of the lever 191 which is within the body of the switch is also provided with an outwardly extending curved portion 194 which is positioned to contact with and move the switch arm 183, the adjustment being such that the contacts 184 and 187 are closed when the operating arm 144 is moved outwardly. It will be understood, of course, that the electric switch herein shown and described may be used to control power current directly or to control the circuit through a relay which in turn controls the power current to the device using the power.

Referring to Figs. 21 and 22, the actuating lever 144 is shown in conjunction with a valve 195 for controlling the flow of a fluid such as gas. The valve 195 comprises a body member in which is formed an inlet passage 196 and an outlet passage 197 communication between which is effected through a valve opening 198 which is surrounded by an annular valve seat 199. A mushroom valve 200 is mounted on one end of a valve stem 201 and is normally urged to closed position on the valve seat 199 by a helical compression spring 202, one end of which surrounds and bears against an outstanding boss or head 203 formed on the top of the valve 200 and the other end of which is received in a socket 204 formed in a closure cap 205. The cap 205 is threaded into the valve body and a gasket 206 is interposed therebetween for effecting a seal.

The other end of the valve stem 201 opposite to that upon which is mounted the valve 200, is axially slidable through a bushing 207 which is riveted in the valve body and protrudes therebeyond into a diaphragm chamber 208 in position to be contacted by a disk shaped flexible diaphragm 209 at a point directly opposite a ball 210. The ball 210 is loosely held in position in an axial bore formed in a disk shaped cap 211 which is threaded into the valve body. The cap 211 is provided with an annular axially extended rim or flange 212 which bears against the peripheral edge of the flexible diaphragm 209 and clamps it against an opposed seat formed in the diaphragm chamber 208, thus providing a fluid tight seal for preventing the leakage of fluid around the valve stem to escape from the valve body. The opening 213 formed in the cap 211 is of two diameters and the step therebetween is inclined to form a ball seat for the ball 210, a portion of which extends beyond the face of the cap 211 in position to be contacted and actuated by the lever arm 144.

The valve 195 for controlling the flow of fluid is mounted on posts riveted in apertures 220 and 221 of frame plate 25 by screws 222 and 223 respectively.

Means are provided for manually moving the actuating lever 144 outwardly to the "on" position and comprise a longitudinally slidable shaft or arm, generally designated 215 in Fig. 7, the details of which are described and claimed in applicant's copending application Serial #146,706 filed of even date herewith.

The actuating arm 144 is provided with a toe 216 (Fig. 8) which is adapted to engage and close the contacts of an electric switch generally designated 217, the circuit of which passes through a signal lamp 218, the details of which are described and claimed in applicant's aforesaid copending application for patent.

A portion of the casing 29 is cut away to provide an inspection opening 224 and through which access may be had for the changing of the light bulb 218. This opening is normally closed by a spring plate 225 which yieldingly snaps into position. Louvres 226 are stamped out from the back of the casing to provide ventilation so that the light burning within the casing will not excessively heat the unit.

The operation of the improved time mechanism is as follows: The synchronous electric motor, through the reduction gears housed within the sealed casing 45, rotates the shaft 46 at the rate of 1 R. P. M. The second hand 55, which is mounted upon shaft 54, the reduced end 53 of which is frictionally engaged in the axially extending socket formed in the end of shaft 46, is rotated in the customary manner by direct drive at 1 R. P. M. The minute hand 65 which is mounted on the sleeve 64 of gear 62 is driven at a 60 to 1 reduction through the driving pinion 56, driven gear 57, pinion 59 and driven gear 60, this being a friction drive through the spring fingers 63 which bear against the gear 60 and which are rigidly mounted with respect to the hub 61.

The hour hand 72 which is mounted on the sleeve 71 is driven at a 12 to 1 reduction with respect to the minute hand through the medium of driving pinion 62, driven gear 66, pinion 68 and driven gear 69, which is rigidly secured to the hub 70, said hub being integrally formed with the sleeve 71.

The hands 65 and 72 of the time-clock may be manually set by rotation by the knurled knob 79 in a left hand direction and which will rotate the shaft 76, gear 75, gear 73 and gear 66. Rotation of the gear 66 will effect rotation of the gears 62 and 69 and thus rotate the sleeves 64 and 71 which are integrally formed therewith, and which carry the minute and hour hands respectively but the gear 60 will not rotate due to slippage of the spring fingers 63 through which the drive from the electric motor is effected.

In the operation of the mechanisms which cause the desired functions to be performed at predetermined times, the "Off" mechanism is first adjusted by rotation of knob 117 in the direction indicated by the arrow thereon. Such rotation, through the gear train 114, 113 and 112 will rotate gear 108 which is secured to the hub or bushing 100 and to which is secured the dial 110. Rotation is continued until the finger 111 of the dial 110 points to the predetermined time as indicated by the indicia arranged around the dial on the clock face and which in Fig. 1 of the drawings is shown as indicating twelve o'clock. Rotation of the gear 108 to this position with the timing mechanism indicating 18 minutes after 9 as shown in Fig. 1 will cause the cam disk 106 to be axially spaced from the set gear 108 by reason of the cam finger 107 riding upon or against the adjacent face of the set gear 108. The aperture or segmental opening 109 through the gear 108 is so positioned with respect to the position of the dial 110 and the indicia upon the clock face that the cam finger 107 will not enter therein until the cam disk 106 has been rotated by the time mechanism to the point where the hands of the time-clock indicate and register the same time as that set off on the dial 110 by the finger 111.

Movement of the separated cam disk 106 to the position shown in Figs. 7, 10, 14, and 16, will move the cam lever 159 about its fulcrum point against the tension of spring 164 and thereby move the link 167, the end of which passes through the pawl spreader 154, to the position shown in Figs. 13, 14, 15 and 16. In this position the pawl spreader permits the spring 152 to yieldingly hold the arcuate shoulder of pawl 151 against the annular shoulder 137 of the function controller or actuator as shown most clearly in Figs. 10 and 13.

The "On" knob 98 is then grasped by the operator and rotated in the direction indicated by the arrow until the pointer finger 101 indicates the number of hours it is desired to have the meal cook. This is set-off on the indicia which is placed upon the dial 110 and in Fig. 1, is shown as being 2½ hours. Rotation of the knob 98 in this manner, through the gear train 93, 92, and 91 will rotate the set gear 88 to such a position that the segmental opening 90 will permit passing of the cam finger 87 thereinto at the time set off by the pointer 101. Such time may be ascertained by passing the line of sight past the dial 110 to the indicia arranged upon the clock face and which is indicated in Fig. 1 as being 9:30. Separation of the time driven gear 83 and the set gear 88 axially from each other by reason of the cam finger 87 riding against the adjacent face of gear 88 as shown in Figs. 7 and 10, will swing the cam lever 120 on its fulcrum against the tension of spring 123 and thus carry the actuating pawl 131 toward the frame plate 25 sufficiently to permit engagement of the arcuate shoulder of the pawl back of the annular shoulder 137 as illustrated in Fig. 10. It will be understood that the pawl 131 is at all times yieldingly urged toward the actuator or function controller so that its arcuate shoulder constantly bears thereagainst when the pawl spreader is in its central aligned position.

When the hands of the time clock are rotated by the synchronous electric motor to the time set-off by the "On" knob the opening 90 in set gear 88 comes in registry with the cam finger 87 so that said finger may enter therethrough. Axial movement of the gear 83 and hub 84 upon which it is mounted then occurs by reason of the spring 123 tending to swing the cam arm 120 in the appropriate direction to cause the toe 127 of the cam arm 120 to yieldingly bear against the annular flange 128 of the hub 84. Movement of the cam arm 120 by the spring 123 when thus permitted causes the arcuate shoulder of the actuating pawl 131 to move the actuator or function controller 135 outwardly with respect to the frame plate 25 as shown in Fig. 14 and when so moved will permit the spring 152 to swing the locking pawl 151 so as to bring its arcuate shoulder back of the annular shoulder 137 and thereby lock the actuator in the position shown in Figs. 14, 15, and 16.

Figure 16:
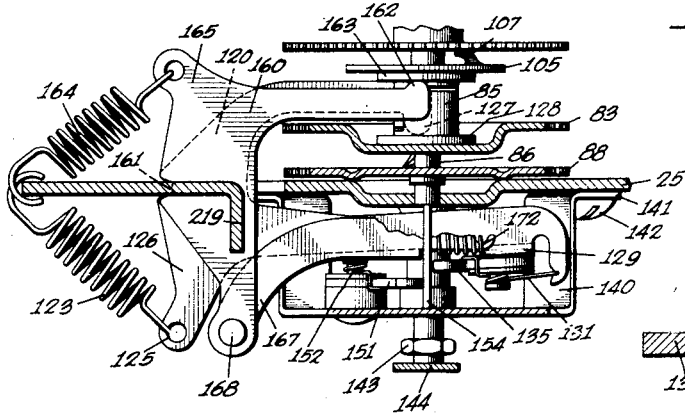
Fig. 16 is a view similar to Figs. 10 and 14, but with the actuating pawl withdrawn and the mechanism held in "on" position by the locking pawl.
Figure 23:
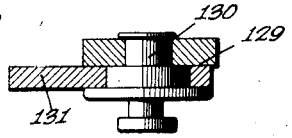
Fig. 23 is an enlarged view of the stud upon which the actuating pawl is mounted.

As shown in Fig. 16, continued movement of the time mechanism will separate the set gear 88 and time driven cam gear 83 and thus retract the actuating pawl 131 but the actuator will be maintained in "On" position by the locking pawl 151.

Figure 14:
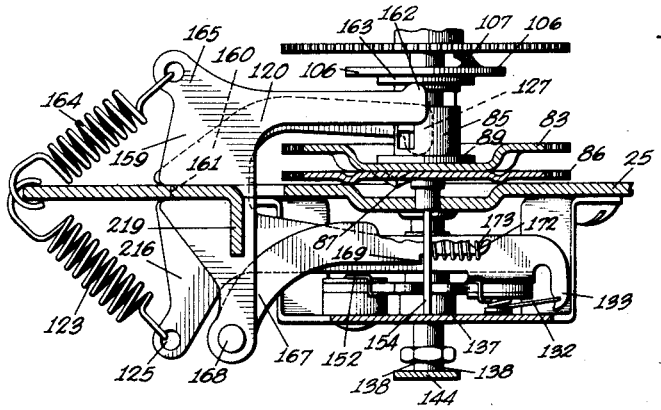
Fig. 14 is an enlarged fragmentary view, partly in section and partly in elevation and similar to Fig. 10, but with the mechanical elements moved to the "on" position.
Figure 15:
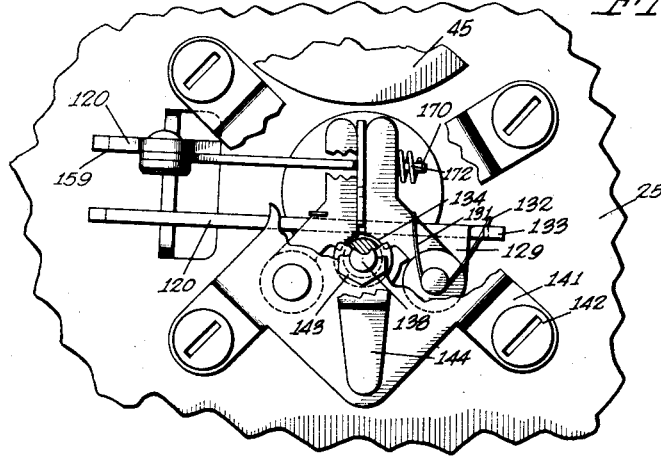
Fig. 15 is a fragmentary view of the same with parts broken away to show the relative positions of the actuating and locking pawls.
Figure 17:
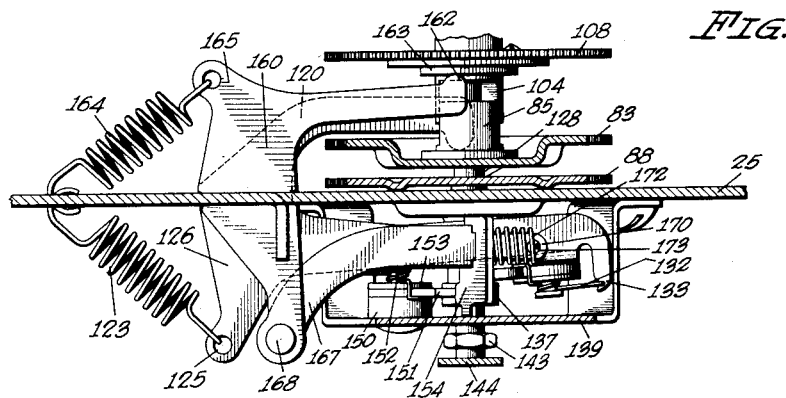
Fig. 17 is a view similar to Figs. 10, 14, and 16, but with the pawl spreader moved so as to release the locking pawl and the mechanism returned to the "off" position.

As the time mechanism continues to drive the gear 83 and through the split sleeve or dental clutches 85 and 104, rotation of the hub 105 and cam disk 106 will bring the cam finger 107 into registry with the opening 109 through set gear 108 and axial movement will take place therebetween by reason of the tension spring 164 yieldingly urging the cam lever 159 to rotate in a left hand direction about its fulcrum point as viewed in Figs. 14, 16, and 17 of the drawings.

Figure 18:
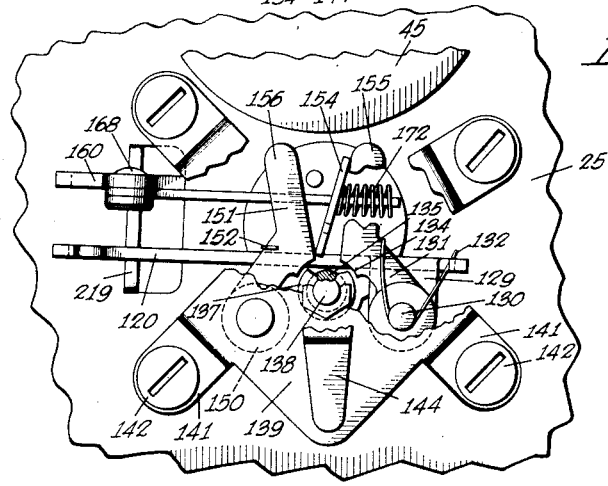
Fig. 18 is an enlarged fragmentary view in elevation with parts broken away to show the relative position of the locking and actuating pawls and pawl spreader in the positions illustrated in Fig. 17.

As shown in Fig. 17, axial movement of the cam disk 106 will permit sufficient rotation of the cam lever 159 to cause the shoulders 169 of link 167 to swing the pawl spreader 154 on its trunnions to the position shown in Figs. 17 and 18, in which position the pawls 131 and 151 are spread apart against the action of their respective springs sufficiently to permit free passage of the annular shoulder 137 therebetween and thus reverse or terminate the function being performed.

The pawl spreader 154 is arranged to move both of the pawls 131 and 151 for the reason that if the "Off" time is within one or one and one-half hours of the "On" time, then the cam finger 87 will not be entirely out of the opening 90 and the actuating pawl 131 will not be entirely withdrawn from the shoulder 137. In the particular embodiment illustrated, it takes substantially two hours of elapsed time for the cam to be entirely biased out of the opening 90. If the "Off" mechanism should be rendered effective at any time prior to this, the actuating pawl 131 would prevent complete return of the function controller 137 if the pawl spreader only released the locking pawl 151.

Although but one specific embodiment of this invention has been herein shown and described, it will be understood that numerous details of the construction may be altered or omitted without departing from the spirit of this invention as defined by the following claims.

I claim:

1. In a time clock mechanism, a rotatable sleeve, means for restraining said sleeve against axial movement, a gear secured to said sleeve, manual means for rotating said gear to a desired predetermined position, friction means for yieldingly holding said gear in selected position, a shaft coaxially journaled in said sleeve, a gear secured to said shaft, manual means for rotating said gear to a desired predetermined position, friction means for yieldingly holding said shaft gear in selected position, a pair of cam members coaxially journaled on said shaft between said sleeve and shaft gears, connections between said cam members for preventing relative rotation thereof while permitting relative axial movement therebetween, time clock actuated mechanism for rotating said cam members in unison, a cam on each of said cam members for bearing against the adjacent gear and holding said cam member and gear in axially spaced relation when in certain angular relationship, said gears having openings for receiving said cams when in registry therewith and thus permit axial movement of said cam members toward their respective adjacent gears, and yielding means normally urging said cam members toward their respective adjacent gears.

2. A structure as set forth in claim 1 including visual indicators connected to said sleeve and shaft and synchronized with the time clock mechanism for showing the times at which axial movement of said cam members will occur.

3. A structure as set forth in claim 1 including a dial secured to said rotatable sleeve and visible upon the time clock face, a group of indicia representing time increments placed upon the time clock face and arranged in consecutive order about said dial, a pointer on said dial for indicating a selected position with respect to the time indicia, numerical indicia placed upon said dial in consecutive order but in reverse order to said time indicia, the numbering of said numerical indicia beginning one time increment unit of angular spacing from said dial pointer, and a finger secured to said shaft for indicating a selected position with respect to said numerical indicia, and in prolongation thereof, indicia upon the clock face.

4. In a time clock mechanism, two pairs of coaxially journaled members, cam means for holding the members of each of said pairs in axially spaced relation when in certain angular positions with respect to each other, means permitting relative axial movement of the members of each pair toward each other when in certain other angular relationships, manual means for rotating one member of each pair of members independently of each other, time clock actuated mechanism for rotating the other member of each pair of members in unison, yieldingly urged lever arms bearing axially against one of each pair of members for causing axial movement thereof, an axially slidable function controller, a shoulder on said function controller, a spring pressed pawl on one of said lever arms adapted to engage said shoulder for moving said function controller upon movement of said lever arm, a spring pressed locking pawl for engaging said shoulder, when said function controller is moved by said lever pawl, and a pawl spreader actuated by said other lever arm for disengaging said pawls from said function controller shoulder.

JOHN H. GRAYSON.